Feb. 20, 1962  R. STASSE  3,021,625
ENGINE POWERED WHEELBARROW
Filed June 6, 1958

INVENTOR
Roland STASSE
BY
ATTORNEYS

United States Patent Office 3,021,625
Patented Feb. 20, 1962

3,021,625
ENGINE POWERED WHEELBARROW
Roland Stasse, 2 Rue du Lac (Department of Seine-et-Oise), Igny, France
Filed June 6, 1958, Ser. No. 740,466
Claims priority, application France June 7, 1957
1 Claim. (Cl. 37—130)

This invention relates to wheelbarrows of the type in which a small internal combustion engine is provided for powering the wheel axle of the barrow, so that the user is relieved of the effort required to propel the barrow and simply uses the shafts to balance and steer the barrow.

Objects of the invention are to provide an improved construction of wheelbarrows of this type, wherein loading and unloading operations will be greatly facilitated with respect to conventional constructions.

Another object is to provide such a wheelbarrow construction, wherein advantage can be taken of the power developed by the engine to assist in the loading and unloading operations. A broad object lies in the provision of an extremely handy and practical manual means of load transportation.

In accordance with an aspect of the invention, there is provided a wheelbarrow comprising a frame having a pair of shafts or the like projecting rearwardly therefrom, a pair of transversely spaced wheels rotatable relatively to the frame and supporting said frame over the ground, a concave load-carrying body mounted on the frame and terminating at its forward end in a generally shovel-shaped portion projecting forwardly of said wheels, a motor supported on the frame, and transmission means including disconnectable clutch means drivingly connecting said motor to said wheels.

According to another feature of the invention, said body, or a front portion of said body including said shovel shaped portion, is pivoted relative to the frame for load dumping purposes.

The objects and features of the invention, as well as detailed constructional forms of my improved wheelbarrow and the advantageous operation achievable therewith, will now be described with reference to the accompanying drawings, given by way of illustration and example, but not of limitation, and wherein.

Figure 1:
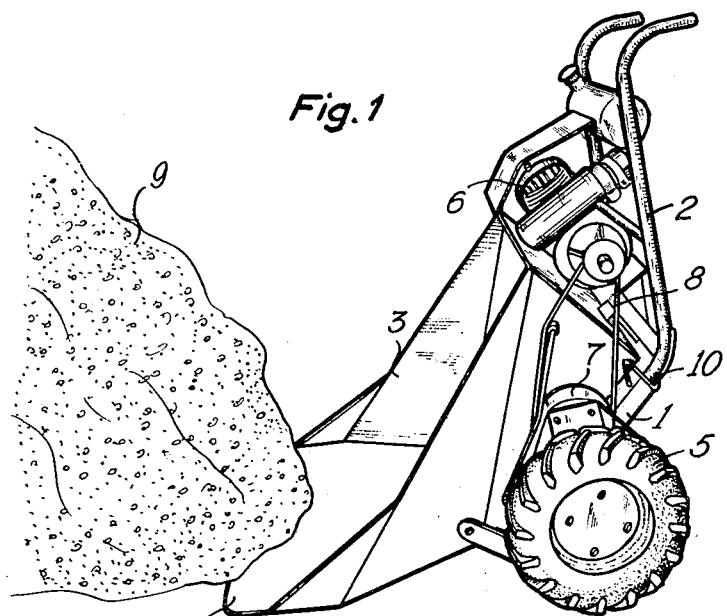
FIG. 1 is a perspective view of one form of improved wheelbarrow in loading position.
Figure 2:
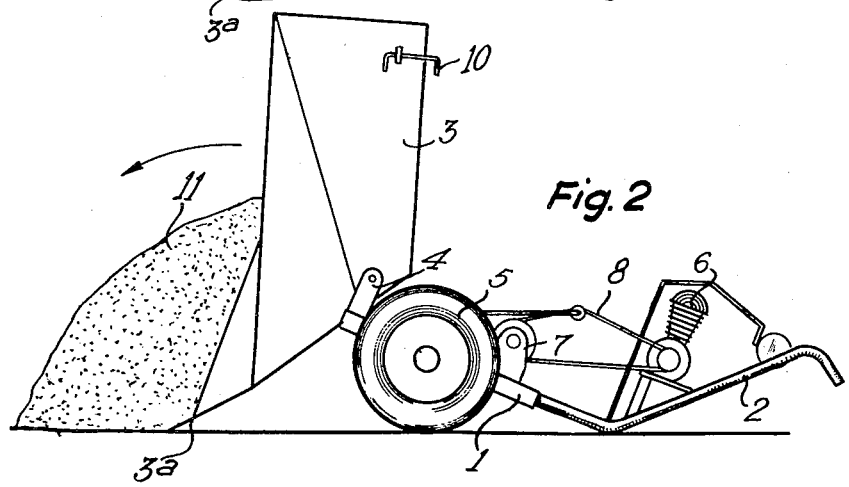
FIG. 2 is a side view of the wheelbarrow in dumping position.

Referring first to the embodiments illustrated in FIGS. 1 and 2, my improved wheelbarrow generally comprises a frame 1 of any suitable type including a pair of spaced side members, which project rearwardly to provide the usual pair of shafts 2 for balancing and wheeling the barrow. Journalled in the frame side members through conventional bearing means is a wheel axle, not visible in the drawings, supporting the side wheels 5. Pivoted on a pair of transversely aligned pivots 4 forwardly of the wheels is the body 3 of the wheelbarrow, made of sheet metal or the like, which includes a conventional concave load bearing portion and a forwardly and upwardly jutting portion 3a shaped as a shovel. A low-powered internal combustion engine 6 is supported at a suitable point of the frame 1, e.g. rearwardly of the body, and is drivingly connected with the wheel axle through suitable conventional means such as the drive belt illustrated, as well as the usual clutch, not shown, which may be operable by means of a hand control such as a lever preferably positioned on one of the shafts 2 for ready actuation by the operator. Further, the drive transmission may include conventional differential means. The body 3 is capable of assuming two positions relative to the frame. Thus, in a loading and wheeling condition, the body 3 is locked in position relatively to the frame by suitable latch means as indicated at 10; this is the position shown in FIG. 1. In the dumping position shown in FIG. 2, the latch means 10 are released and the body 3 is tilted forwardly relatively to the frame.

With the construction described, a loading operation is effected as follows: the empty wheelbarrow is wheeled to a position adjacent a heap 9 of material to be loaded. With the body 3 locked to the frame by the latch means 10, the shafts 2 are raised upwards so that the shovel portion 3a is abutting against the base of the heap, as shown in FIG. 1. The engine is then started, or the clutch is reengaged in case the engine was already running, so that the shovel 3a is forced to dig into the base of the heap of material. At the same time, the shafts 2 are manually wielded up and down, and this action, together with the reaction of the material against the forwardly propelled shovel portion 3a, results in quickly and easily digging the shovel deep into the heap of material with the exertion of only a small amount of muscular effort. The cavity of body 3 is thus rapidly filled up whereupon the wheelbarrow drops back by gravity to its normal position with the shafts 2 generally horizontal. It is noted that owing to the shape of the concave body 3, whereby the center of gravity of the filled body is positioned at a small distance longitudinally from the wheel axle, leverage acting to rock back the barrow to normal position under gravity is moderate and this rocking movement is effected gently even in the case of a load of heavyweight materials.

The barrow is then steered clear of the heap and towards the place of discharge, under engine power, so that all that is required of the operator is to steer the barrow and to balance it longitudinally.

To discharge the load, the latch 10 is disengaged, and shafts 2 are raised a small amount sufficient to cause body 3 to rock forwardly about the pivots 4 relatively to the frame 1, thereby dumping the load of material 11 over the shovelling portion 3a. The empty body is rocked back and latched in position.

Figure 3:
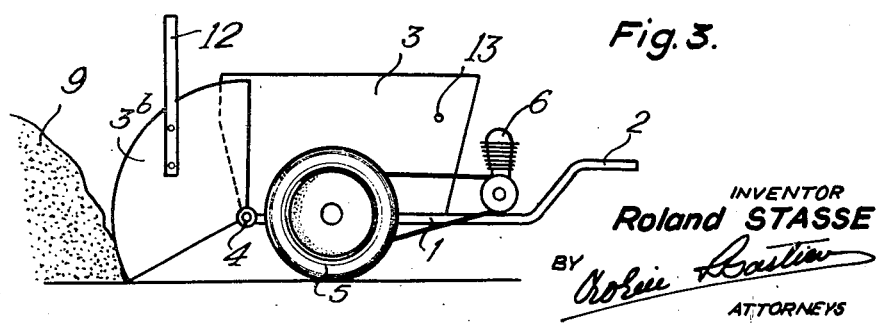
FIG. 3 is a side view of another embodiment in dumping position.

In the modified construction shown in FIG. 3, similar elements have been designated by the same references as in FIGS. 1 and 2. The chief difference lies in the fact that the body 3 instead of being bodily rockable relatively to the frame, is constructed in two parts, including the rear portion 3 fixedly secured to the frame 1 and the forward portion 3b, formed as a shovel at its forward end, and rockable relative to the frame and rear portion about the pivots 4. An arm 12 secured to and projecting rearward from the front portion 3b is adapted to cooperate with latching means 13 on the side of the body portion 3 for latching both portions together in the loading and wheeling condition of the barrow. The general operation of the barrow thus constructed is generally similar to that described in connection with the form of embodiment shown in FIGS. 1 and 2, except that in this case the barrow does not require to be tilted bodily forwards by means of the shafts 2 for loading. Instead, it is simply necessary to release the latch 12—13 whereupon the movable shovel portion 3b drops forward to the position shown in FIG. 3. The engine is then clutched in and the arm 12 may be operated back and forth to cause the shovel 3b to dig into the heap of material, in a manner similar to what was obtained in the first embodiment by up-and-down movement of the shafts 2.

What I claim is:

A power driven wheelbarrow comprising an axle, a pair of wheels each fixedly mounted on an opposite end of said axle, a flat frame mounted on said axle with said axle extending laterally of a medial portion of said frame, a pair of angular shafts connected at one end to and extending from one end of said frame providing operating handles for the wheelbarrow, an open top concave body including a rear wall, a forwardly inclined front wall and side walls extending between said rear and front walls, an engine mounted on said shafts adjacent the other end thereof rearwardly of said concave body rear wall, transmission means operatively connecting said axle to said engine, said concave body front wall having a portion extending outwardly beyond said body side walls, partial extensions of said side walls connecting said side walls and said frontwall extended portion providing a shovel-like portion to said body, means pivotally connecting said body front wall to the other end of said frame whereby said body can be mounted on said frame in the normal wheeling position for said wheelbarrow to a loading and unloading position with said shovel-like portion engaging the material to be loaded and means for latching said body to said frame when mounted thereon.

References Cited in the file of this patent

UNITED STATES PATENTS

| | | |
|---|---|---|
| 2,533,549 | Bell | Dec. 12, 1950 |
| 2,638,172 | Borchin et al. | May 12, 1953 |
| 2,918,133 | Ericsson | Dec. 22, 1959 |

FOREIGN PATENTS

| | | |
|---|---|---|
| 976,769 | France | Nov. 1, 1950 |